US006952872B2

United States Patent
Garabedian (10) Patent No.: US 6,952,872 B2
(45) Date of Patent: Oct. 11, 2005

(54) METHOD FOR REDUCING STRESS ON THE MULTI-CONDUCTOR CABLE

(76) Inventor: Arthur Garabedian, 1899 S. Santa Cruz St., Anaheim, CA (US) 92805

( * ) Notice: Subject to any disclaimer, the term of this patent is extended or adjusted under 35 U.S.C. 154(b) by 326 days.

(21) Appl. No.: 10/224,893

(22) Filed: Aug. 21, 2002

(65) Prior Publication Data

US 2003/0051899 A1 Mar. 20, 2003

Related U.S. Application Data

(60) Provisional application No. 60/314,384, filed on Aug. 23, 2001.

(51) Int. Cl.[7] .............................................. H01R 43/00
(52) U.S. Cl. ........................ 29/857; 29/830; 29/33 F; 455/404.1; 379/52; 379/155; 379/434; 361/680; 361/727; 174/117 F
(58) Field of Search ................... 29/830, 857, 33 F; 455/404, 550; 379/52, 155, 434; 361/680, 727; 174/117 F, 117 FF (56) References Cited

U.S. PATENT DOCUMENTS 5,760,558 A * 6/1998 Popat ......................... 318/480
5,801,512 A * 9/1998 Adams et al. ............... 320/137
5,854,831 A * 12/1998 Parsadayan et al. ..... 379/102.06
6,016,253 A * 1/2000 Seitz et al. .................. 361/735
6,038,127 A * 3/2000 Ries ........................... 361/680
6,047,173 A * 4/2000 Leyen et al. ............. 455/404.1
6,049,973 A * 4/2000 Frank et al. .................. 29/830
6,060,979 A * 5/2000 Eichsteadt ................... 340/287
6,317,489 B1 * 11/2001 Parsadayan ............ 379/102.06
6,367,693 B1 * 4/2002 Novogrod .................... 235/379
6,536,966 B1 * 3/2003 Butler ......................... 400/492
6,683,584 B2 * 1/2004 Ronzani et al. ................ 345/8
6,751,473 B1 * 6/2004 Goyal et al. ............. 455/556.1

FOREIGN PATENT DOCUMENTS

KP         5190024       * 7/1993

* cited by examiner

Primary Examiner—Rick Kiltae Chang (57) ABSTRACT

The object of this invention is to provide an improved connection between a TTY keypad and an emergency call box. This is accomplished by lengthening and re-routing the multi-conductor ribbon cable that connects the TTY to the call box. Thus relieving the stress on the cable. This prevents the cable from cracking from fatigue and rendering the TTY box useless.

7 Claims, 12 Drawing Sheets

MODIFIED KEYPAD DRAWER WITH EXTENSION CABLE

EXISTING KEYPAD DRAWER AND FLEX CABLE

METHOD FOR REDUCING STRESS ON THE MULTI-CONDUCTOR CABLE

PRIORITY CLAIM

This application claims benefit under 35 USC 119 E provisional application No. 60/314,384 filed Aug. 23, 2001.

FIELD OF INVENTION

This invention relates to an emergency call box with an attached TTY Box which has an extending keyboard, for use by the hearing-impaired or alternately for high noise environments, such as freeways, as shown in U.S. Pat. No 6,038,127 with sound walls.

BACKGROUND OF INVENTION

It is known that there are emergency call boxes on most freeways. A user can access said Call Box to contact an emergency dispatch operator. Some of these call boxes have been provided with telecommunications devices for the deaf (TTD) or text telephony (TTY).

A separate enclosure is mounted below the main housing of the call box which contains a motorized key plate. Attached to the key plate is a TTD keypad, which is a membrane type keypad. This forms of what we will refer to as the keyboard. The keyboard is used in conjunction with the display module. The decision to use a standard handset or keyboard and display is made by the motorist. When the TTY is selected the keyboard extends automatically so the user can bi-directionally communicate with an emergency dispatch operator without the need for voice communication.

BACKGROUND OF PRIOR ART

The call box and the keyboard are connected by a multi conductor ribbon cable. However this connection is vulnerable to damage due to stress placed upon the ribbon cable. As the tray moves in and out, the ribbon cable flexes back and forth. Due to the minimal clearance between the TTY box and the call box, the cable is forced to make a sharp bend that results in fatigue placed on the cable causing cracks in the cable, rendering the keypad useless.

BRIEF SUMMARY OF INVENTION

To overcome the problem of cable fatigue, I have extended and rerouted the multi conductor ribbon cable. In doing this, I have created a wide loop in the cable underneath the keyboard thus eliminating the stress that was causing the interruption of the electrical continuity.

BRIEF DESCRIPTION OF DRAWINGS

In drawings, closely related figures have the same numbers but different alphabetic suffixes:

FIG. 3 A–F shows the original keyboard connection to the main call box in various positions as the drawer moves in and out.

FIG. 4 A–E shows the modified keyboard connection to the main call box in various positions as the Drawer moves in and out.

FIGS. 6 A&B shows key-plate with modified ribbon securely attached to front & rear

DRAWINGS REFERENCE NUMERALS 1 housing of call box
2 housing of TTY box
3 connection between call box and TTY box
4 keypad
5 key-plate
6 front of TTY box
7 cover plate of TTY box
8 screws to attach cover plate
9 cable passage way
10 bolts connecting call box to TTY box
11 cable guide
12 ribbon cable
13 ribbon cable connector
14 extension ribbon cable
15 ribbon cable junction
16 ribbon cable secured to key-plate
17 secured to inside keyboard housing
18 ribbon cable stress point at top of keypad
19 ribbon cable stress point at passage way to call box

DESCRIPTION OF INVENTION

Figure 1:
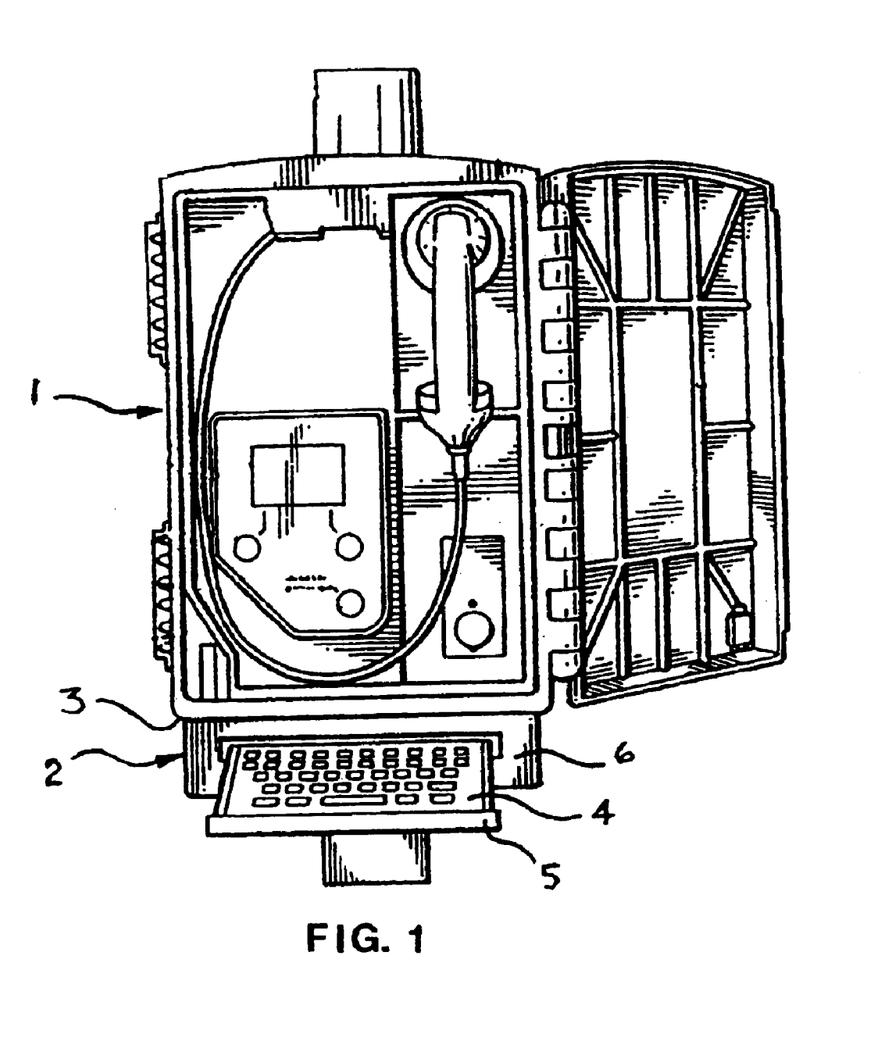
FIG. 1 shows a call box with attached TTY keyboard.

As shown in drawings for purpose of illustration an emergency call box FIG. 1 with attached TTY capabilities. The TTY box is a separate enclosure 2 mounted below the call box. The front of the TTY box has a key-plate with an attached key pad, this enables the user to communicate with an emergency dispatch operator without the use of voice communication. The decision to use a standard hand set or key-pad is made by the motorist. If TTY is selected the key-plate and attached keypad extends to allow the motorist to bi-directionally communicate. The keypad is connected to the call box by a multi-conductor ribbon cable.

The existing method of connecting the call box to the TTY keypad causes a sharp bend in the cable. This places stress and fatigue on the cable causing the cable to crack and lose continuity.

My method for alleviating stress and fatigue between the TTY and call box is extending the cable and re-routing said cable in the TTY enclosure to alleviate sharp bends which results in cracks and breaks. This process is described in detail below.

DETAILED DESCRIPTION OF THE INVENTION

FIG. 1 shows an emergency call box 1 with an attached TTY enclosure 2 that is connected 3 to the housing of the call box. 1. above it. The TTY key-plate 5 with attached keypad 4 are extended from the front of the TTY enclosure 6.

Figure 2:
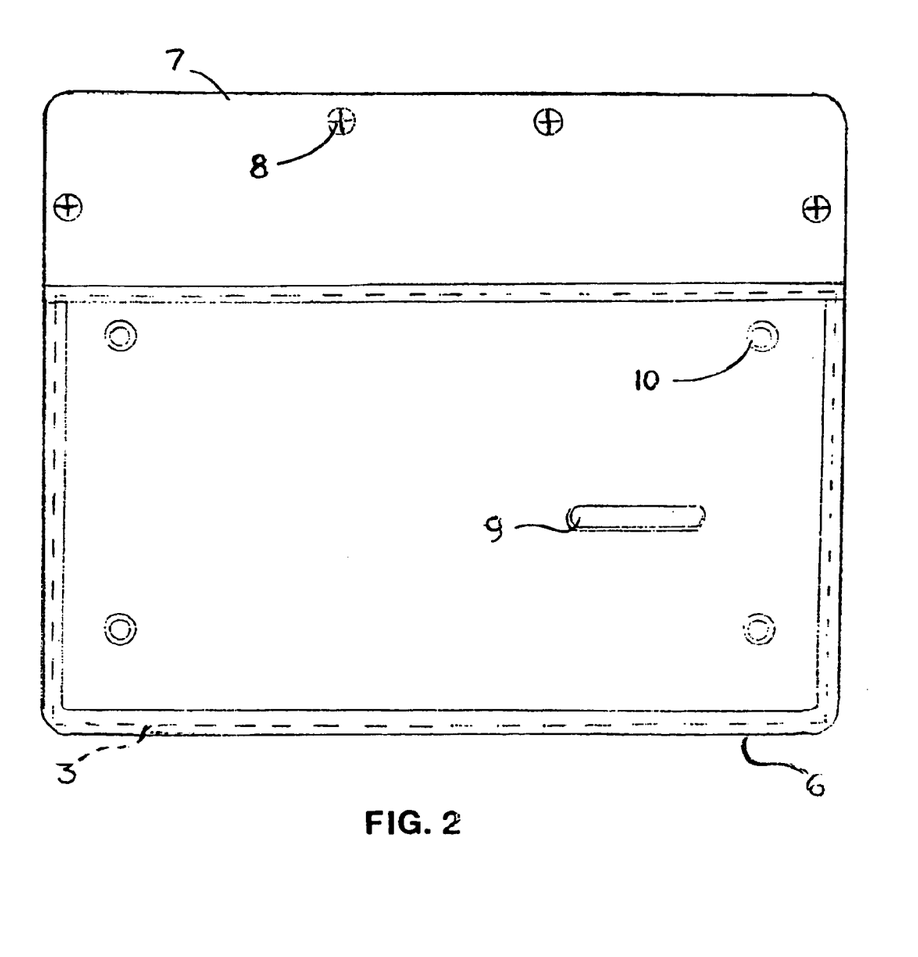
FIG. 2 shows the connection between the TTY keyboard and the main call box.
Figure 3A:
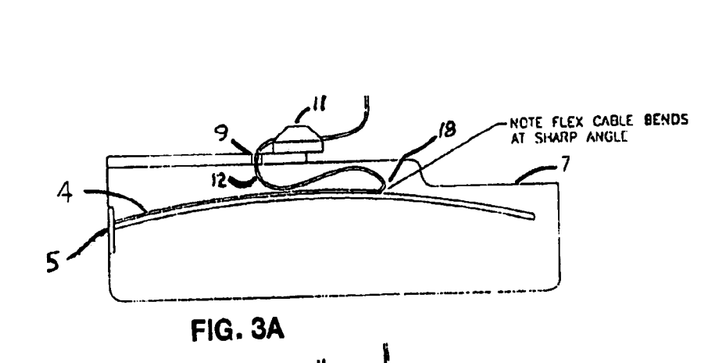
Figure 3B:
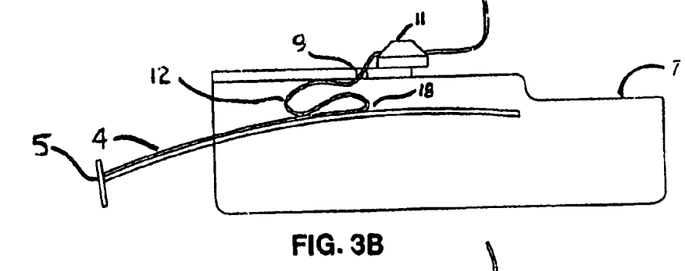
Figure 3C:
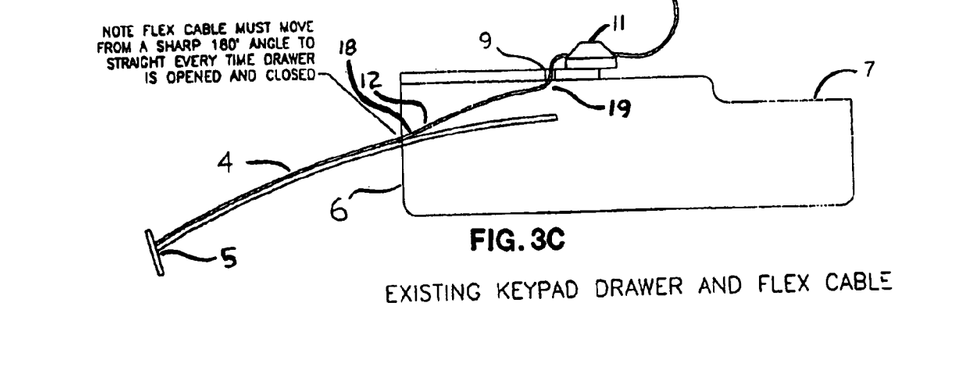
Figure 3D:
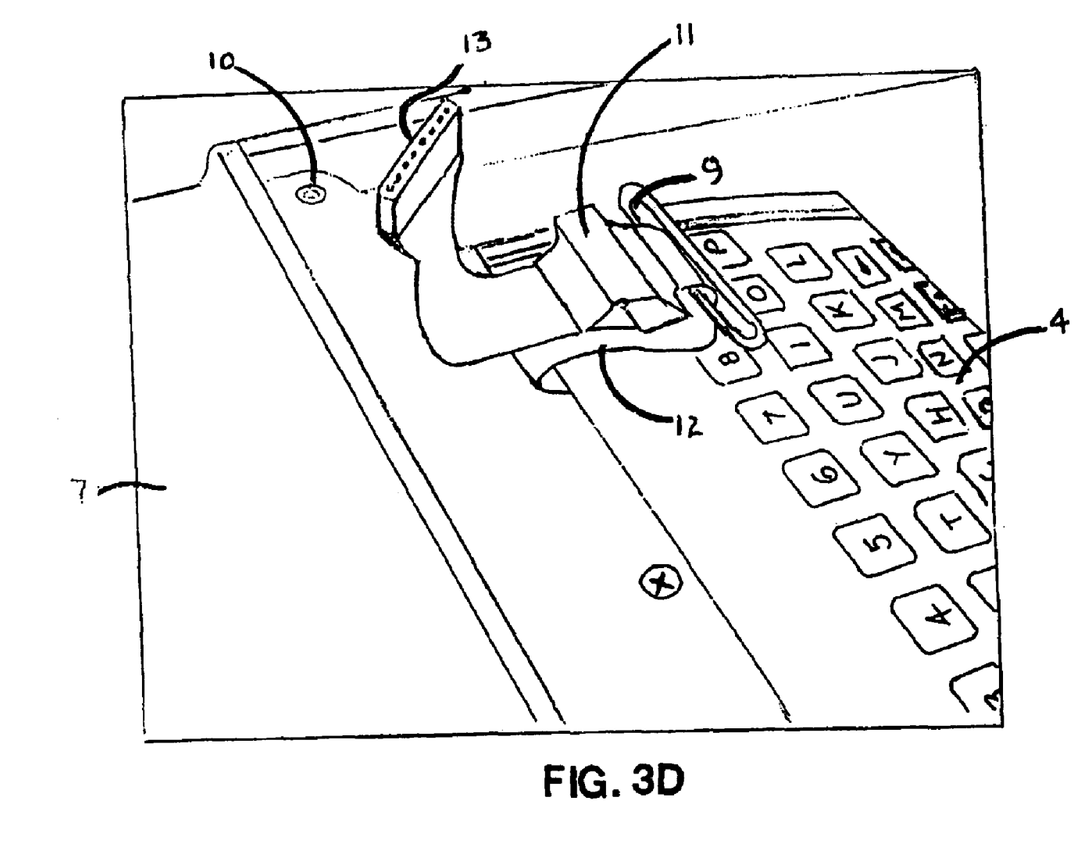
Figure 3E:
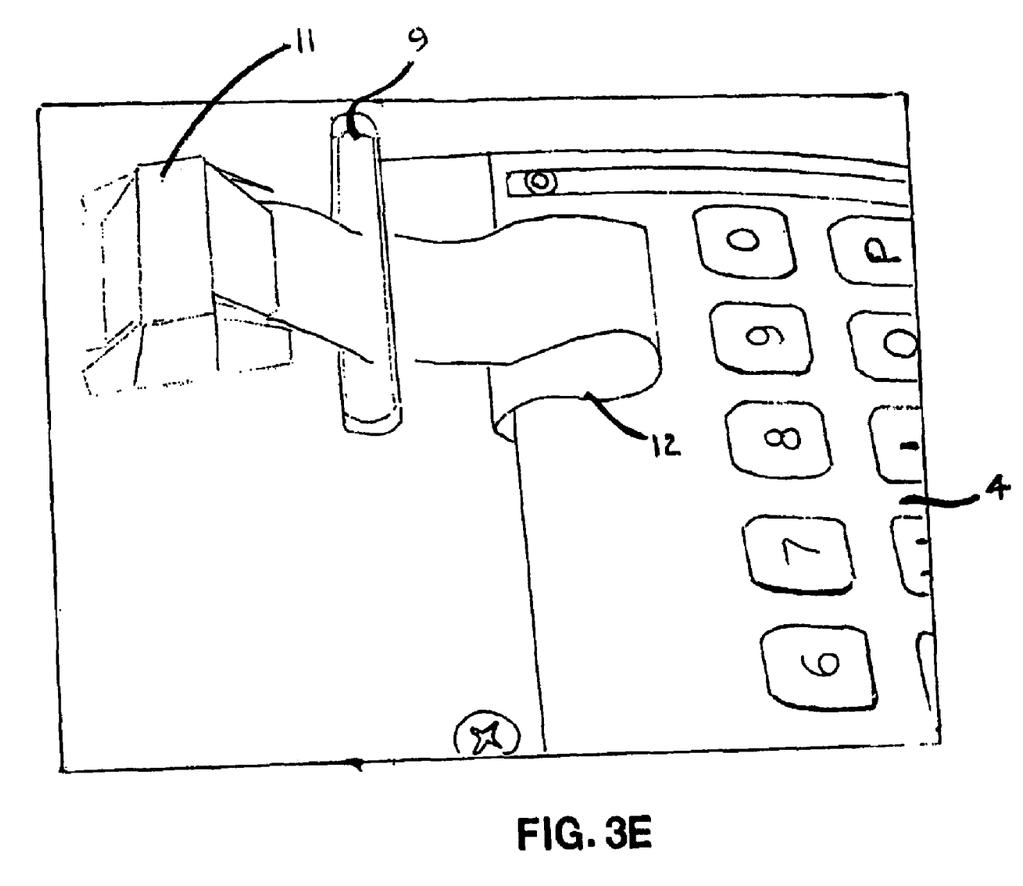
Figure 3F:
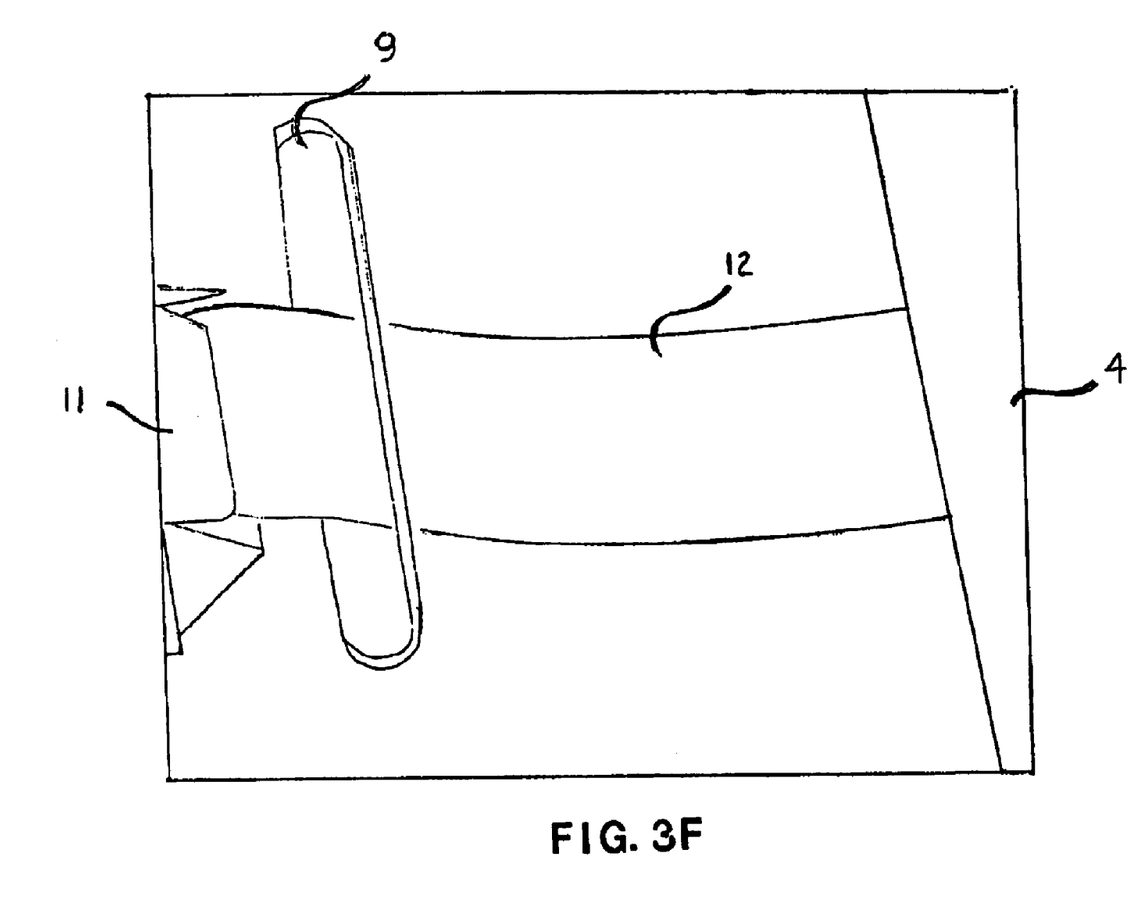

FIG. 2 top view of TTY 2 indicating connecting surface 3 between call box 1 and TTY 2 which is bolted 10 below. There is a cover plate 7 connected by screws 8 that is exposed. The oblong slot 9 is the passageway by which the ribbon cable 12 connects the keypad 4 to the call box 1.

FIGS. 3 A B & C is a side view of the TTY 2 showing the existing route of multi-conductor ribbon cable 12. to the passageway 9 into the bottom of the call box 1. 3A illustrates the key plate 5 and keypad 4 in a closed position. The ribbon cable 12 is shown as it comes off of the keypad 4 at a sharp angle 18 on its way to the call box 1. 3B illustrates the key plate 5 with attached keypad 4 in mid cycle or semi-open/ closed position. In addition the cable 12 is forced to bend again in an area with minimal clearance. 3C illustrates a keyplate5 with attached key pad fully extended. This position shows the stress 19 to the ribbon cable 12 at the passageway 9 to the call box 1 as it connects to the cable guide 11. FIGS. 3 DE&F partial top views of TTY 2 of existing method of routing cable 12 to call box 1. FIG. 3D is a top view of 3A and shows the stress 18 placed on the ribbon cable 12 due to the minimal clearance between key plate 5 with attached key pad 4 and passageway 9 when key plate 5 with attached key pad 5 is fully retracted The ribbon 12 comes out of TTY 2 and is connected to call box with ribbon cable connector 13 FIG. 3E is a partial top view of 3A showing the stress 18 to the cable 12 when key plate 5 with attached key plate 4 is in mid cycle. FIG. 3F is a top view of 3C when key plate 5 with attached key pad 4 is fully extended causing cable 12 to stress to the ribbon cable at the passage way 9 to the call box 1

FIGS. 4 AB&C side-view of TTY 2 showing the improved method of routing ribbon cable 12 around key plate 5 and through TTY 2 as to eliminate stress.

Figure 4A:
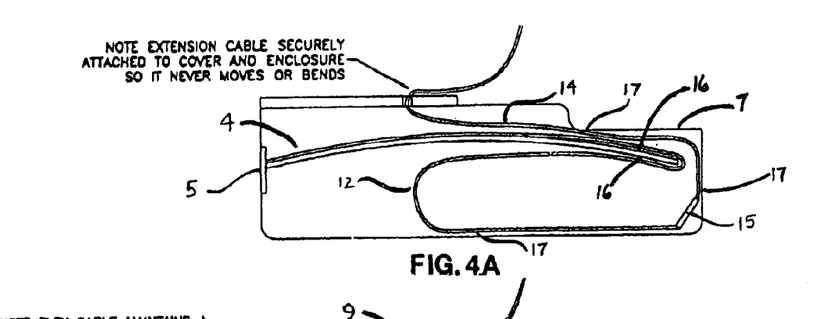
Figures 4B, 4C:
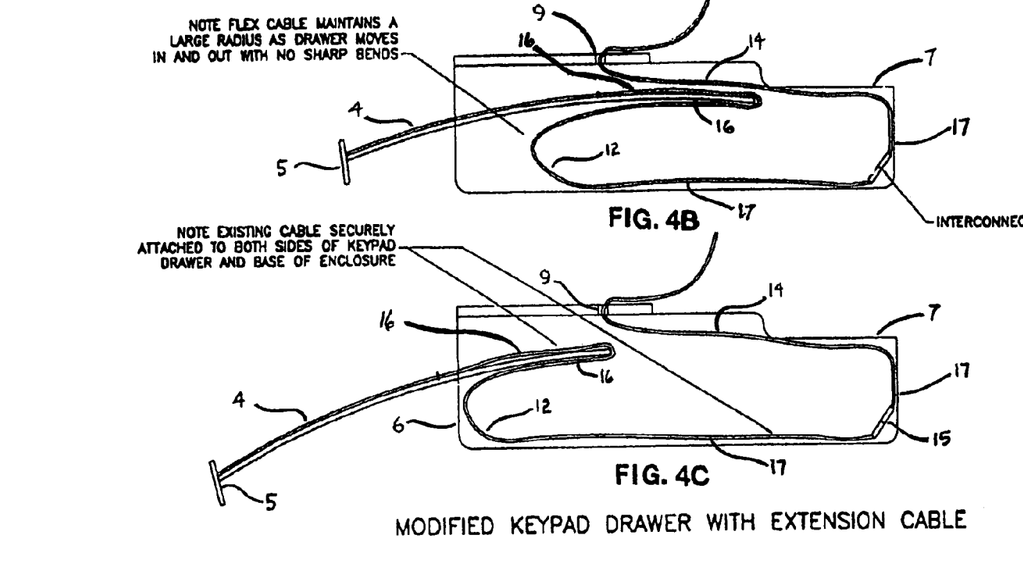

In FIGS. 4A, 4B & 4C the multi conductor cable 12 leaves the keypad 4 for and is adhered 16 all the way to the end of the key plate 5. It then wraps around the end of the key-plate 5 and is adhered to underside of end of key-plate 5 for a limited distance as the cable travels towards front 6 of TTY enclosure 2. It then makes a large 180-degree loop downward and travels along the bottom of the TTY enclosure 2 toward the back. It is secured 17 to the inside bottom of TTY enclosure 2 and continues on to rear of enclosure where it turns up and its connector is secured 17 to enclosure. An extension cable 14 is plugged into the connector 15. The extension cable 14 travels up the inside of the rear of the enclosure where it turns towards the front 6 of the TTY and is secured 17 to the bottom of the cover plate 7. The cable then continues toward the front of the enclosure until the cable exits through the passage way 9 to the inside of the call box 1. FIG. 4-A shows a side view of a TTY enclosure 2 that the keypad 4 and key-plate 5 are in the closed position FIG. 4B shows that as the keypad 4 extends the ribbon cable 12 has no stress points in that only the large loop has changed position or location. FIG. 4C shows that when the keypad is at a fully extended position there are no stress points in that only the loop has changed position.

Figure 4D:
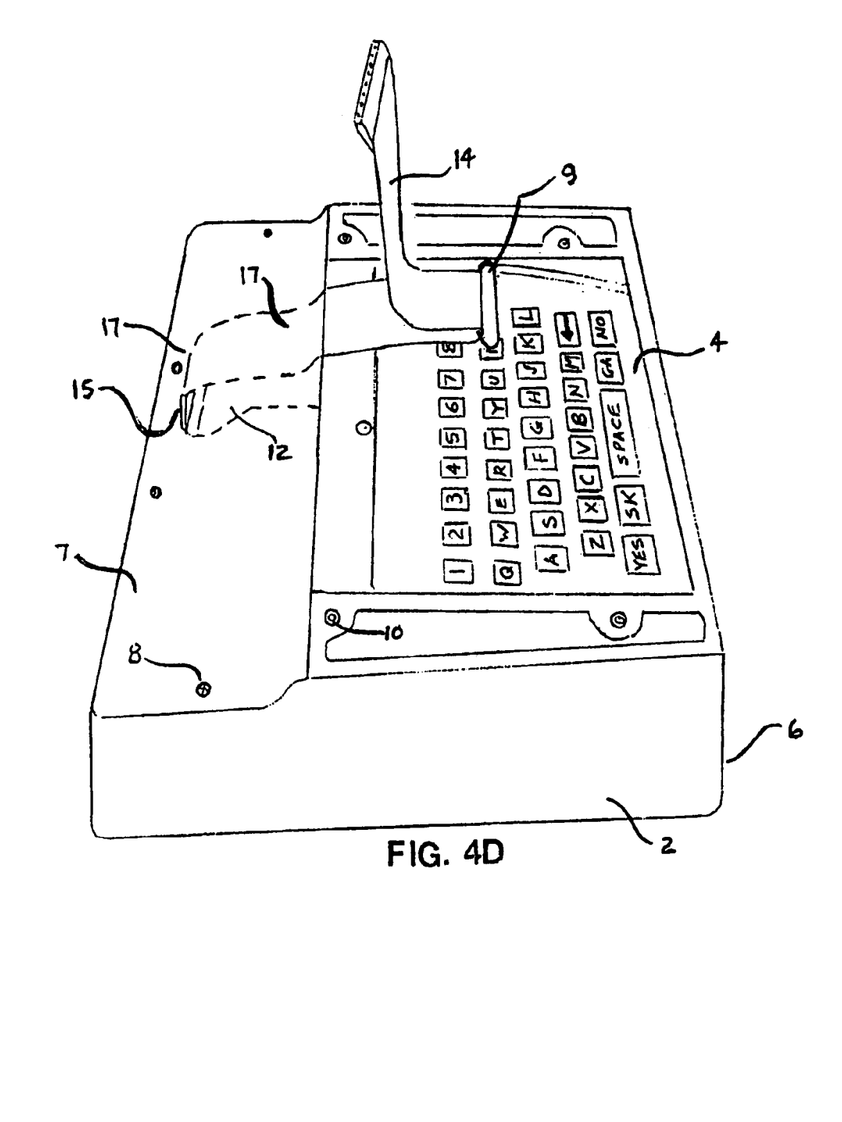

FIG. 4D is a top view of FIG. 4A.

Figure 4E:
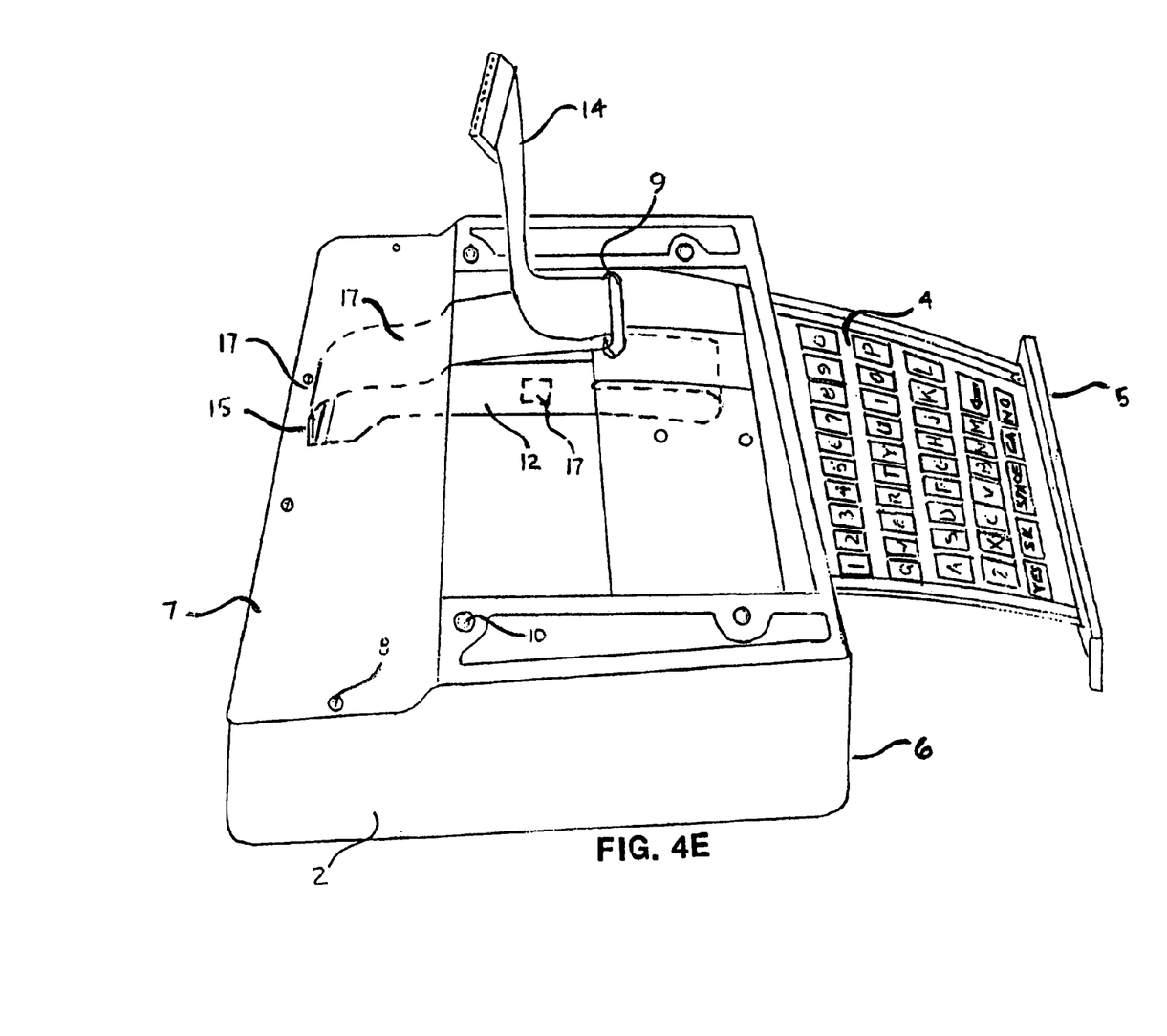

FIG. 4E is a top view of FIG. 4C.

Figure 5:
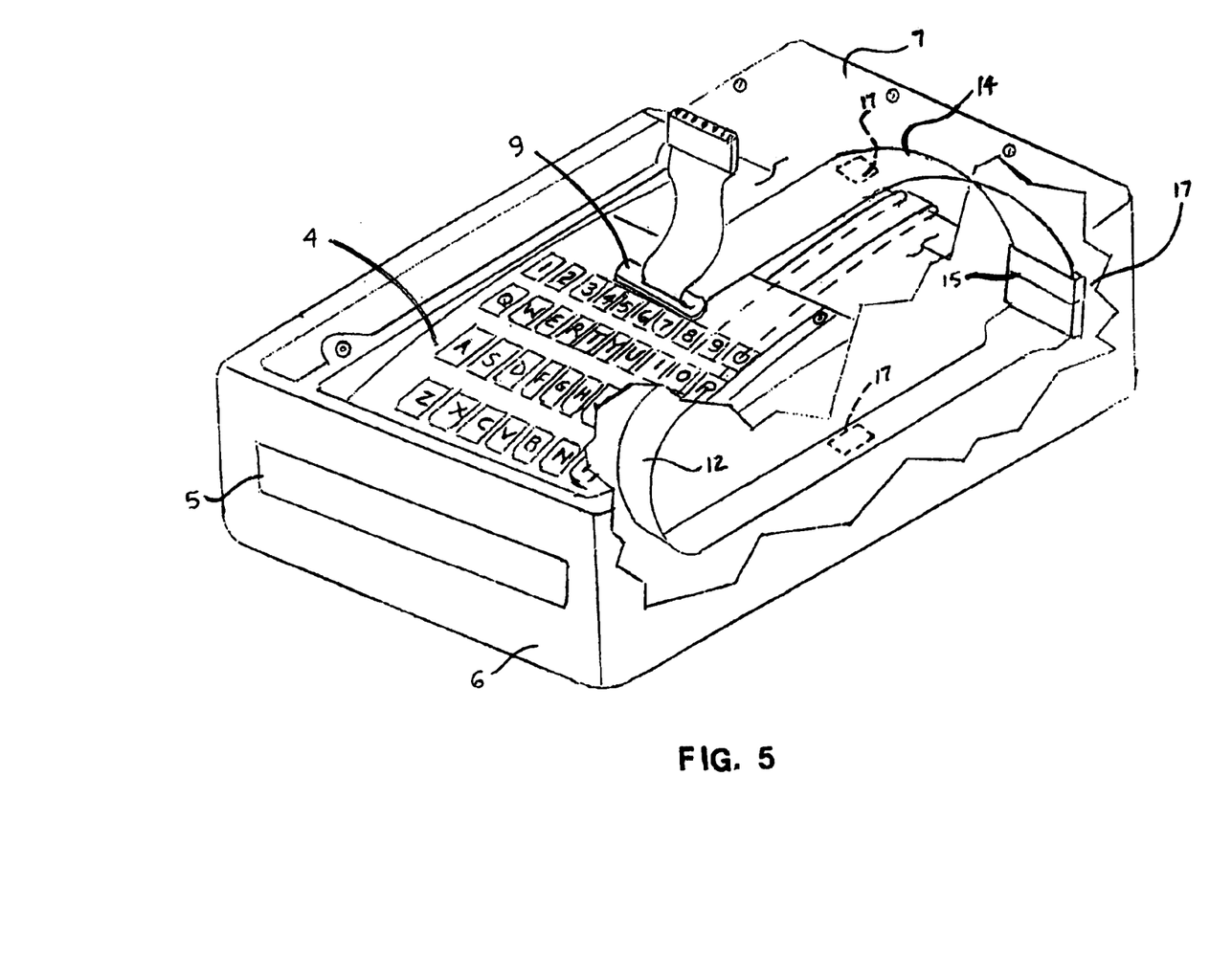
FIG. 5 shows a side view of the modified connection between the call box and the TTY box.

FIG. 5 cut away side view of TTY 2 after the cable 12 has been re-routed. The ribbon cable 12 has been fastened to the top and bottom of the key-plate (see FIGS. 6A & B) then moves toward the front 6 of the TTY box 2. It then makes a wide bend and is attached to the bottom 17 of the TTY box 2. The cable 12 continues to travel to the rear of the box 2 and the connector 13 is secured to the back wall 15. An extension cable 14 is added, which is secured under the cover plate 7 then routed through the passageway 9 that connects to the call box 1.

Figure 6A:
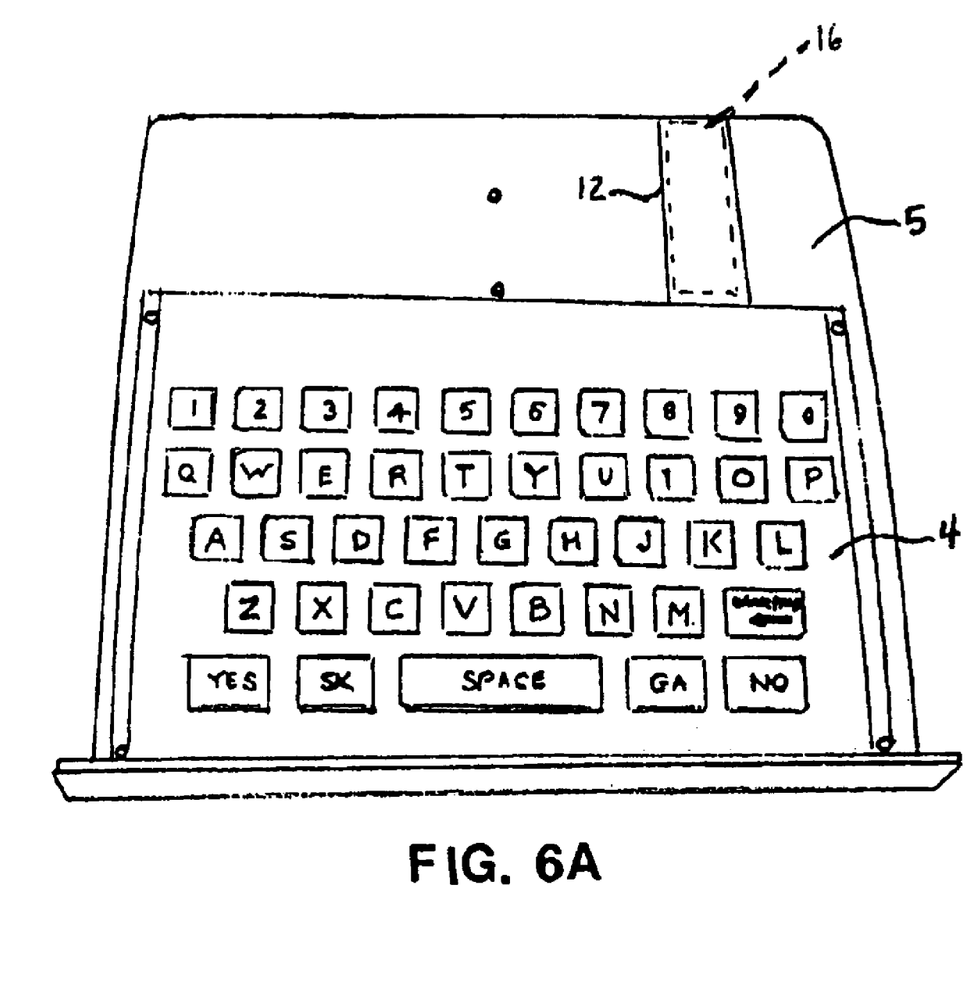
Figure 6B:
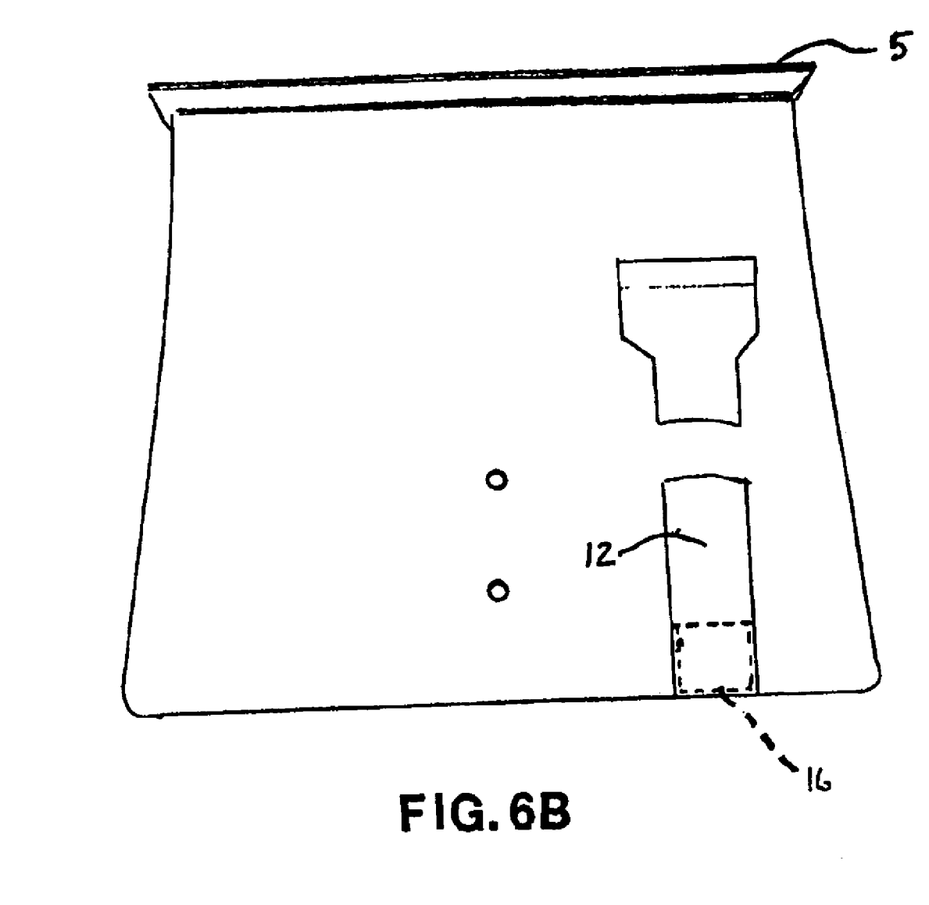

FIG. 6 A shows a view of a key-plate 5 with an attached to key pad 4. The ribbon cable 12 is securely fastened 16 to front of key pad 4. FIG. 6B is the bottom view of the keyplate 5 and shows the ribbon cable 12 as it is secured 16 to the back of the key plate 5.

What is claimed in my invention:

1. A method for reducing stress on a multi conductor ribbon cable—comprising the steps of:

positioning a key pad on a key plate that is enclosed in a text telephony (TTY) enclosure with an opening formed at a top thereof;

attaching the ribbon cable to the top of the key pad;

extending the ribbon cable toward a back end of the plate;

looping the ribbon cable around the back end;

extending the ribbon cable from the back end toward the front of the TTY enclosure;

curving the ribbon cable to form a wide loop that extends from underneath the plate to a front of the TTY enclosure;

extending a ribbon cable towards a back of the enclosure;

extending an extension cable from the bottom of the call box through the opening;

running the extension cable from the opening to the back of the enclosure;

connecting the extension cable to the ribbon cable, wherein the ribbon cable maintains the wide loop whenever the plate is extended or returned to the TTY enclosure.

2. The method according to claim 1, wherein said ribbon and extension cables are one ribbon cable with a same configuration as the cables.

3. The method according to claim 2, wherein the ribbon cable is configured in separate conductors.

4. The method according to claim 3, wherein the extension cable is configured in separate conductors.

5. The method according to claim 2, wherein said ribbon and extension cables are one extension cable.

6. The method according to claim 2, wherein the extension cable is multiple extension cables with separate conductors.

7. The method according to claim 1,2,3,4,5, or 6, further comprising securing the cables at different locations.

* * * * *